June 25, 1963 E. M. JOST 3,095,500
SOLID-PHASE BONDING OF METALS
Filed Jan. 11, 1961 2 Sheets-Sheet 1
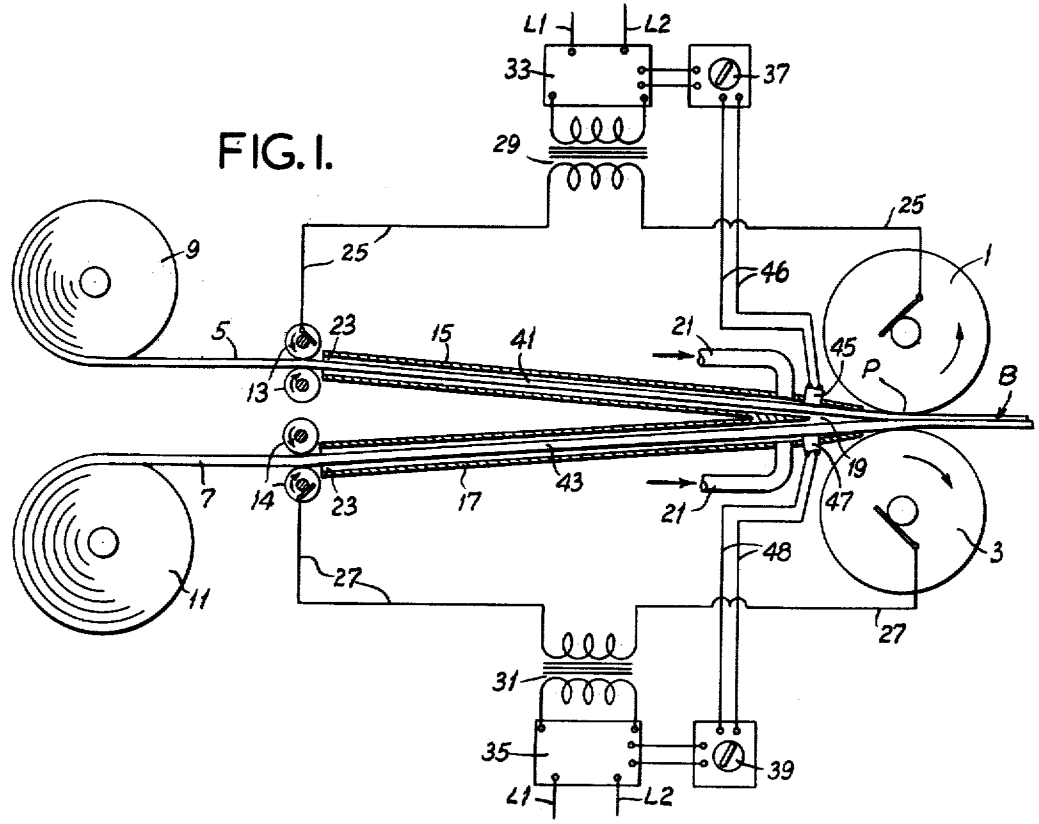
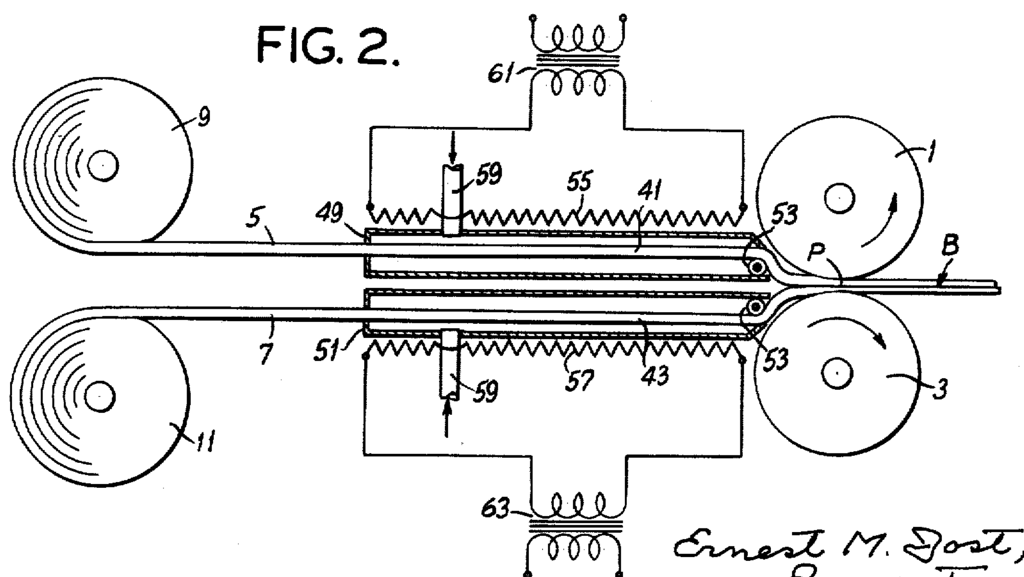
Ernest M. Jost,
Inventor.
Koenig and Pope,
Attorneys.

SOLID-PHASE BONDING OF METALS
Filed Jan. 11, 1961 2 Sheets-Sheet 2
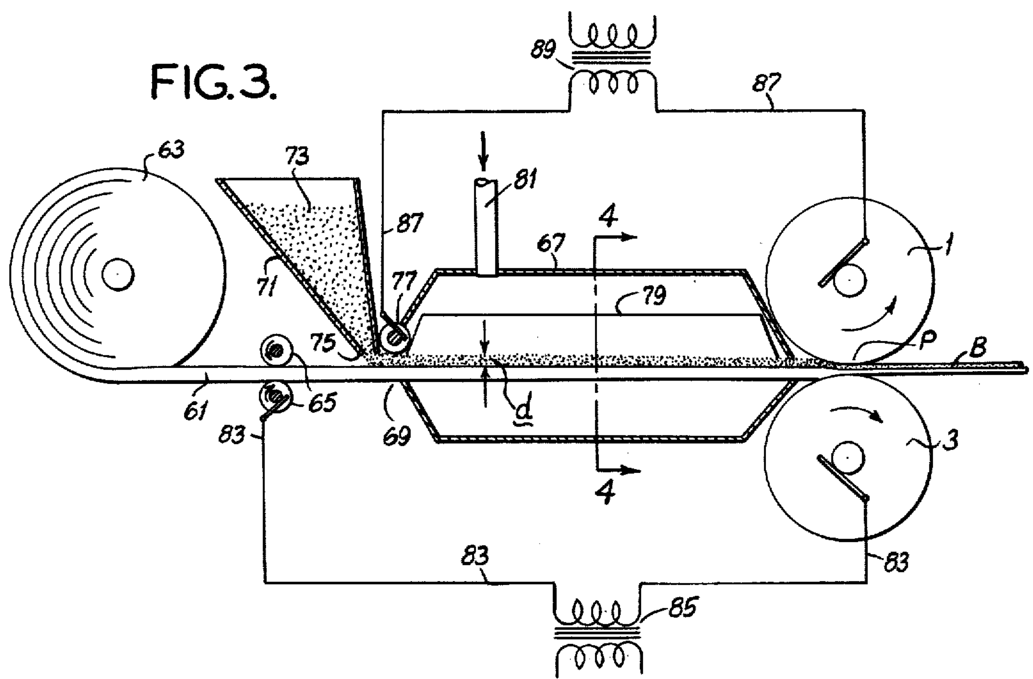
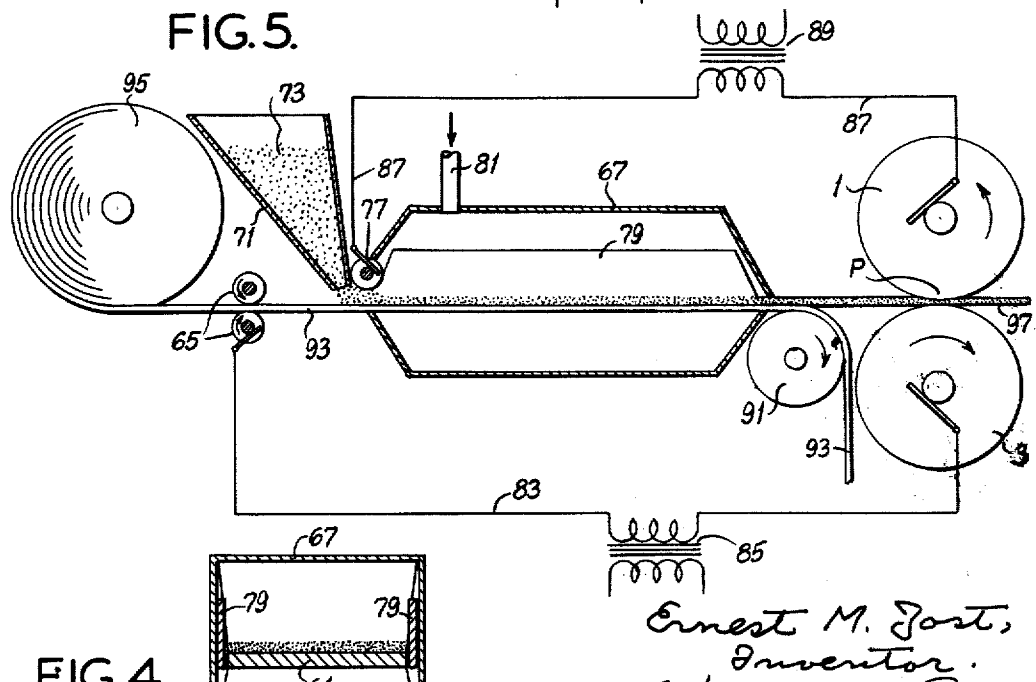
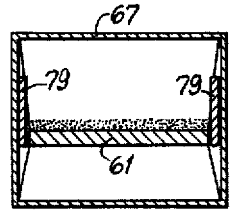
FIG. 4.
Ernest M. Jost,
Inventor.
Koenig and Pope,
Attorneys.

United States Patent Office 3,095,500
Patented June 25, 1963

3,095,500
SOLID-PHASE BONDING OF METALS

Ernest M. Jost, Attleboro, Mass., assignor to Texas Instruments Incorporated, Dallas, Tex., a corporation of Delaware Filed Jan. 11, 1961, Ser. No. 82,012
11 Claims. (Cl. 219—117)

This invention relates to the solid-phase bonding of metals, and with regard to certain more specific features, to temperature-controlled bonding of this type.

Among the several objects of the invention may be noted the minimization of certain difficulties attendant upon the successful bonding of metals having initially widely different physical, chemical, mechanical or like properties; the provision for solid-phase bonding of metals with convenient temperature controls for effecting modifications of said physical, chemical, mechanical or like properties of the metals to be bonded; and the provision of a controlled solid-phase bonding process which will economically produce bonded metal products of superior qualities. Other objects and features will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of which will be indicated in the following claims.

In the accompanying drawings, in which several of various possible embodiments of the invention are illustrated, FIG. 1 is a diagrammatic view illustrating one arrangement for carrying out the invention for the solid-phase bonding of two solid metal strips;

FIG. 2 is a diagrammatic view similar to FIG. 1, showing another arrangement for solid-phase bonding of solid metal strips;

FIG. 3 is a diagrammatic view similar to FIGS. 1 and 2, showing an arrangement for the solid-phase bonding of finely divided metal to a solid metal strip;

FIG. 4 is a diagrammatic cross setcion taken on line 4—4 of FIG. 3; and

FIG. 5 is a diagrammatic view similar to FIG. 3, showing an arrangement for solid-phase bonding of finely divided metal to form another form of strip.

Corresponding reference characters indicate corresponding parts throughout the several views of the drawings.

The term metals is used herein in its broad sense including alloys.

I have discovered that substantial improvements can be effected in a solid-phase bonding operation and in the bonded products thereof by improved means for preliminary heating of the metal substances to be bonded, whether these substances are in solid or in finely divided form. The invention is applicable to manufacture of a sintered and bonded product from finely divided metal, and to the manufacture of composite metal products from solid metals, or from solid and finely divided metals, these metals having, if required, different physical, chemical, or mechanical properties such as formerly sometimes lead to difficulties in the application thereto of solid-phase bonding processes. In general, the invention relates in the solid-phase bonding process to a preliminary application of heat to discrete materials at different temperatures. Typical solid-phase bonding processes upon which the invention is an improvement are set forth in United States Patents 2,691,815 and 2,753,623. Following are typical examples of conditions under which the present invention is advantageous:

(A) To reduce magnesium it is preferable that it be warm-rolled, due to its tendency to crack at its edges if rolled at room temperature. The preferred warm-rolling temperature is 200° C. If magnesium, without edge-cracking, is to be solid-phase bonded to another metal wherein both metals are preliminarily heated to the same temperature, it is not possible to bond the magnesium to a metal with a melting point below 200° C., because the other metal in that case will melt. Warm bonding of the magnesium to such a metal will be possible only if the magnesium is heated separately to the 200° C. temperature while the other metal is kept at a temperature below its melting point. The invention provides for such separate heating and thus in the present example makes possible a superior product involving one low-melting point component, the other component being magnesium not cracked at its edges.

(B) In the solid-phase bonding of a soft metal such as silver to a harder metal such as stainless steel or molybdenum, warm bonding with both components at the same temperature results essentially in the deformation during reduction of the softer metal only. By heating the harder metal to a higher temperature than the softer metal, preliminary to deformation for solid-phase bonding, their mechanical properties can be adjusted so that both materials being bonded will undergo substantially the same deformation.

(C) Sometimes it may be desirable to solid-phase bond a softer metal such as tin to a harder metal such as nickel, in which the latter is required to be in a fully annealed condition after bonding. Since the annealing temperature of nickel is higher than the melting point of tin, the tin-nickel in composite solid-phase bonded form cannot after bonding be heat-treated to anneal the nickel, assuming the nickel to have been work-hardened by reduction during the bonding operation. Therefore, it is desirable to have the nickel annealed prior to bonding with the tin and that it be not hardened during bonding. This demands that the annealed nickel shall not be substantially deformed during bonding so as to avoid work-hardening of it. It is therefore desirable to heat the softer tin exclusively before bonding in order to accomplish bonding in a reduction process in which most or all of the reduction will occur in the tin, and less or none in the previously annealed nickel.

(D) Sometimes it is desired to adjust the physical properties of a combination of a hardenable alloy with another metal. In such event the bonding temperature of the hardenable alloy is chosen to be below the hardening temperature of the alloy.

(E) Many metals such as stainless steel, manganese alloys and the like cannot, or can only with great difficulty, be heated to so-called intermediate temperatures (500° C. or so) in industrial atmospheres without the formation of oxide films, which prevent solid-phase bonding. In such cases, differential heating of the components of a combination will provide a means for heating the oxidation-sensitive metal or alloy to a temperature at which tarnishing reaction is slow, while the other metal may be heated to a much higher temperature.

(F) In many cases, mechanical and chemical properties need to be considered simultaneously. For example, in the case of steel on stainless steel, a theoretically good solid-phase bond could be achieved at 500° C. If the stainless steel could be kept oxide-free. In industrial atmospheres this is only possible with temperatures above 900° C. to 1,000° C. The stainless steel therefore must be heated to the latter temperature range. The steel is heated to a temperature at which it has the same mechanical strength as the heated stainless steel, so that the steel deformation under solid-phase bonding conditions will be the same as that for the stainless steel.

(G) Sometimes it is desirable continuously to form a length of solid metal all of which or at least one component of which is produced by solid-phase bonding of a metal in a finely divided state requiring application of heat at different temperatures to the finely divided material and a support therefor.

(H) The invention is particularly advantageous for use with brittle materials, both hard and soft. An example of a soft brittle material is magnesium, above mentioned. Examples of hard brittle materials are molybdenum and high manganese steel alloys. The invention is particularly useful for solid-phase bonding such brittle materials, both to ductile metals and also to each other. The differential heating to be described is particularly useful, for example, in bonding two brittle materials, one of which is relatively soft and the other of which is relatively hard, such as magnesium and molybdenum.

Other examples could be given but it is believed the above are sufficient to indicate the advantages of the invention, which in general are to provide means for differentially preheating, to different temperatures, two metallic components, whereby their various physical, chemical and mechanical characteristics may be adjusted to permit solid phase bonding under proper conditions.

Referring now more particularly to FIG. 1, wherein is shown one form of the invention, numerals 1 and 3 indicate squeezing or reduction rolls of a rolling mill. These serve to produce the solid-phase bonding pressures as outlined in United States Patent 2,753,623. Numerals 5 and 7 indicate strips of metal which are fed from supply rolls 9 and 11 to the bite or pinch point P between the rolls 1 and 3. Contact and guide rolls are shown at numerals 13 and 14. These guide the strips 5 and 7 through controlled-atmosphere retorts 15 and 17, respectively. These retorts 15 and 17 join one another near the pinch point P, as shown at 19. The appropriate atmosphere is introduced into the retorts 15 and 17 through inlets 21 to infill the retorts 15 and 17, escaping therefrom at their open ends 23, and also by leakage where the strips emerge from the junction 19. Appropriate reducing atmospheres may be hydrogen, dissociated ammonia, cracked city gas or the like. Air may be introduced if an oxidizing atmosphere is demanded. Nitrogen or argon may be employed if a neutral atmosphere is demanded.

At numeral 25 is shown an electrically conductive connection between roll 1 and one of the rolls 13, and at 27 an electrically conductive connection between roll 3 and one of the rolls 14. In the connections 25 and 27 are power sources shown by way of example as transformers 29 and 31, respectively, these being fed by saturable reactors 33 and 35, respectively, the latter being excited from line wires L1 and L2. At numerals 37 and 39 are manually adjustable controllers which operate through the saturable reactors 33 and 35, respectively, to control current delivered to the connections 25 and 27, respectively. Thus control is established of currents flowing along two paths, first through the connection 25 and the reach 41 of strip 5 in retort 15, and second through the connection 27 and the reach 43 of strip 7 in retort 17. Automatic regulation of current according to a value set at controller 37 is obtained by a thermocouple 45, wired to controller 37 as shown at 46. The thermocouple 45 responds to the temperature of the strip 5 at its region of application to the pinch P. Automatic regulation of current according to a value set at controlled 39 is obtained by a thermocouple 47, wired to controller 39 as shown at 48. The thermocouple 47 responds to the temperature of the strip 7 at its region of application to the pinch P. While automatic regulation is shown, it will be understood that manual regulation is also admissible.

In view of the above, it will be seen from FIG. 1 that current flow through reaches 41 and 43 of strips 5 and 7 may be independently controlled, thus independently controlling the temperatures of these reaches. The particular temperatures selected at 37 and 39 are maintained by means of the thermocouples 45 and 47, respectively.

It is assumed that the strips 5 and 7 in supply rolls 9 and 11 have been cleaned, so that under suitable pressure and reduction in thicknesses at the pinch point P and at the preheating temperatures attained in the retorts 15 and 17 a solid-phase bond B will be obtained under suitable pressure between the rolls 1 and 3. According to the present invention, temperatures may be maintained independently in the strips as they approach the pinch point P for purposes such as commented upon under Examples A–H set forth above.

In FIG. 2 is shown another form of the invention in which heating is accomplished without passing current through the strips to be bonded. In this case, the strips 5 and 7 pass through retorts 49 and 51, respectively, being guided to their outlets by guide rolls 53. From the outlets the strips pass to the pinch point P for solid-phase bonding by squeezing and reduction at this point. The retorts 49 and 51 are heated by resistance heaters 55 and 57, respectively, and are supplied with the desired atmosphere through inlets 59. The heaters 55 and 57 are connected to a power source through any suitable means, such as transformers 61 and 63, respectively. For control purposes, suitable manual heater control means may be employed, or automatic means such as shown in FIG. 1. The important feature is the independent variation of the temperatures of the retorts 49 and 51. The operation of the FIG. 2 form of the invention will be obvious from what has been set forth as the operation of the FIG. 1 form.

In FIGS. 3 and 4 is shown another form of the invention in which numerals 1 and 3 indicate the mill rolls operating at a pinch point P. These receive a single strip of metal 61 from a supply roll 63. The strip 61 passes through contact and guide rolls 65. At numeral 67 is shown a controlled-atmosphere retort through which the strip 61 passes in moving from the rolls 65 to the pinch point P. Located ahead of an inlet 69 of the retort 67 is a hopper 71 for feeding finely divided or powdered metal 73 onto the strip 61. Between the lower outlet 75 of the hopper 71 and the inlet 69 of the retort 67 is a contact and leveling roll 77 which determines the depth *d* of powder deposited upon the strip 61 for movement through the retort. Powder-retaining side walls 79 adjacent the strip 61 in the retort 67 prevent falling of the powdered material from the strip.

At numeral 81 is shown an inlet for any atmosphere desired to be used in the retort 67. At numeral 83 is shown an electrical connection between roll 3 and bottom roll 65, supplied with current from a power source such as 85. At 87 is shown an electrical connection between roll 1 and roll 77, supplied with current from a power source such as 89. Thus currents may be sent through the reach of the strip 61 and the reach of the powdered material passing through the retort 67. This makes the strip hot at the point where the powder is fed onto it, this being due to the current flowing through the connection 83. The current flowing through connection 87 increases the amount of current passed through both the strip 61 and the powder in the retort. This heats the powder to the desired temperature. The hot powdered particles will sinter or weld together within the retort to form a spongy mass of considerable solidity as it reaches the roll bite at P. This welding or sintering of the powder particles is considerably enhanced by the high resistance which occurs at the junctions between particles, resulting in heating to a considerably higher temperature at the junctions than the remaining bulk of the powder. This accounts for the effective welding between metal particles and to some extent between them and the strip 61 in the retort 67. The sintering of the particles places them, as they emerge from the retort 67, in a favorable condition for an effective bite thereon by rolls 1 and 3, even when the powder is of substantial depth on the strip 61. The squeezing action of the rolls compresses and compacts and also bonds the sintered particles among themselves and to the strip 61. The result is a composite strip, both elements of which are dense and solid. The solid-phase bonding is responsible both for bonding of the particles between themselves and to the strip component.

In FIG. 5 is shown another form of the invention like that shown in FIG. 3, in which like numerals designate like parts. In this case, however, the rolls 1, 3 are spaced away from the end of the retort 67 a sufficient distance to interpose a take-off roll 91 for the electrically heated metal strip 93, which takes the place of the strip 61 in FIG. 3. Strip 93 is drawn from a supply roll 95 to receive the powdered material 73 at the inlet of the retort 67 and is drawn away from the sintered sheet of powder in its path between the outlet of the retort 67 and the pinch point P, as illustrated.

The strip 93 acts as a powder carrier. It should in this case be composed of material which does not react under heat, contaminate or sinter with the powder. The carrier strip is heated electrically, as will be clear from FIG. 5. As the powder 73 is fed onto the strip 93, it receives heat from the heated strip and, in addition, is heated by the circuit extending through the powder itself. As the strip travels toward the rolls 1, 3, it becomes gradually hotter. The use of direct resistance heating in the powder helps sinter the powder, since, as above made clear, it produces localized hot spots at the small points of contact between the powder particles.

The sintered powder is self-sustaining in its path from the strip 93 to the pinch P. At the pinch point P it is squeezed sufficiently to produce a dense strip, the closely compacted cohered particles of which are solid-phase bonded. A subsequent sintering step will further improve the bond to provide a substantially solid strip of materials composed of the metal which was originally in the finely divided form in the metal 73 in the hopper 71. The finished solid strip is indicated at 97.

It will be understood that as respects all forms of the invention contemplated herein, squeezing of the metals may be obtained by means other than the particular rolls 1, 3 shown. It is also to be understood that in all forms of the invention the solid-phase bond obtained at the outlet from the pinch point P between the rolls 1 and 3 may be further improved by a subsequent heating step if desired. While direct and indirect resistance heating means have been disclosed, it will be understood that other heating means may be employed such as inductive heating, gas-fired heating or the like.

It will be noted as respects FIGS. 1 and 2 that each length of metal may, if desired, be surrounded in its respective retort with a different ambient atmosphere, i.e., an atmosphere best suited to its needs. In FIGS. 3 and 5 the same ambient atmosphere surrounds both metal lengths in their paths through the retort.

While in the usual case both strips are heated, this is not essential in all cases. There may be combinations of materials as to which it would be desirable, or even essential, not to heat one of the components above its normal temperature. In such event it is required only to deexcite an appropriate one of the heating circuits.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. The bonding method comprising moving reaches of discrete metal portions toward squeeze means through individual paths extending from supplies for said reaches, individually electrically heating at least one of said reaches in its path to prepare it for solid-phase metallurgical bonding by raising its temperature to a degree different from that of the other but short of its liquid phase passing into the squeeze means at least one of said reaches which has been heated, and applying pressure on the metal portions in the squeeze means to effect pressurized solid-phase metallurgical bonding of discrete parts thereof.

2. The bonding method comprising moving reaches of discrete metal portions toward squeeze rolls through individual paths extending from supplies for said reaches, individually electrically heating each of said reaches in its respective path to prepare it for solid-phase metallurgical bonding by raising its temperature to a degree different from that of the other but short of its liquid phase, passing both of said reaches between the squeeze rolls, and applying pressure on the metal portions between the squeeze rolls to effect pressurized solid-phase metallurgical bonding therebetween.

3. The bonding method comprising moving different solid metal strips along reaches toward squeeze rolls through individual paths extending from supplies therefor, individually electrically heating each of said reaches by passing current therethrough of values to produce different temperatures in the respective reaches to prepare them individually for solid-phase metallurgical bonding at individual temperatures of different degrees which are short of their liquid-phase temperatures, passing both of said reaches in contact between the squeeze rolls, and applying sufficient pressure to the strips between the squeeze rolls to effect pressurized solid-phase metallurgical bonding therebetween.

4. The bonding method according to claim 2, wherein the strips are composed of unlike metals.

5. The bonding method according to claim 4, wherein said unlike metals are of different hardnesses and said different temperatures bring them to more nearly equal hardnesses.

6. The bonding method according to claim 5, wherein said unlike metals have soft brittle and hard brittle characteristics.

7. The bonding method according to claim 6, wherein said soft brittle and hard brittle metals are magnesium and molybdenum.

8. The bonding method according to claim 4, including the step of heating the metallurgically bonded strips after they have issued from said rolls to improve the metallurgical bond therebetween.

9. The bonding method according to claim 4, including the step of maintaining the reaches under a protective atmosphere in their approaches to the rolls.

10. The bonding method comprising moving different strips which are in solid and powder metal forms respectively along reaches toward squeezing rolls through individual paths extending from supplies for said reaches and wherein the powder reach is carried on the solid reach, individually electrically heating each of said reaches by passing current therethrough of values to produce different elevated temperatures in the respective reaches but short of their liquid phases to prepare them for solid-phase metallurgical bonding, passing both of said reaches in contact between the squeeze rolls, and applying pressure to the strips from the squeeze rolls to produce pressurized solid-phase metallurgical bonding between the particles of the powder strip and between some of them and the solid strip.

11. The bonding method according to claim 10, including the step of maintaining the reaches under a protective atmosphere in their approaches to the rolls.

References Cited in the file of this patent

UNITED STATES PATENTS

| | | |
|---|---|---|
| 446,974 | Lemp et al. | Feb. 24, 1891 |
| 2,290,338 | Koehring | July 2, 1942 |
| 2,299,877 | Calhins | Oct. 27, 1942 |
| 2,350,179 | Marvin | May 30, 1944 |
| 2,582,744 | Brennan | Jan. 15, 1952 |

FOREIGN PATENTS

| | | |
|---|---|---|
| 519,279 | Germany | Feb. 26, 1931 |

UNITED STATES PATENT OFFICE

CERTIFICATE OF CORRECTION

Patent No. 3,095,500 June 25, 1963

Ernest M. Jost

It is hereby certified that error appears in the above numbered patent requiring correction and that the said Letters Patent should read as corrected below.

Column 4, line 5, for "controlled" read -- controller --; column 6, line 17, for "phase passing" read -- phase, passing -- column 6, line 46, for the claim reference numeral "2" read -- 3 --.

Signed and sealed this 7th day of January 1964.

(SEAL)
Attest:

ERNEST W. SWIDER
Attesting Officer

EDWIN L. REYNOLDS
Acting Commissioner of Patents